United States Patent
Chen

(10) Patent No.: US 7,991,164 B2
(45) Date of Patent: Aug. 2, 2011

(54) METHOD FOR MODIFYING THE COMPATIBILITY OF AN AUDIO ANALYZING APPARATUS WITH AN APPLICATION PROGRAM

(75) Inventor: Ai-Min Chen, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tucheng Dist., New Taipei (TW)

( * ) Notice: Subject to any disclaimer, the term of this patent is extended or adjusted under 35 U.S.C. 154(b) by 1496 days.

(21) Appl. No.: 11/308,746

(22) Filed: Apr. 28, 2006

(65) Prior Publication Data
US 2007/0019814 A1     Jan. 25, 2007

(30) Foreign Application Priority Data
Jul. 22, 2005    (CN) .......................... 2005 1 0036157

(51) Int. Cl.
*H04R 29/00* (2006.01)
(52) U.S. Cl. .................. 381/58; 381/56; 324/76.11
(58) Field of Classification Search ............ 381/58, 381/56; 700/94; 324/76.11
See application file for complete search history.

(56) References Cited

U.S. PATENT DOCUMENTS

| | | | | |
|---|---|---|---|---|
| 5,581,621 A * | 12/1996 | Koyama et al. | ............... | 381/103 |
| 6,819,924 B1 | 11/2004 | Ma et al. | | |
| 7,039,643 B2 * | 5/2006 | Sena et al. | ............... | 707/691 |
| 7,188,186 B1 * | 3/2007 | Meyer et al. | ............... | 709/231 |
| 2006/0149558 A1 * | 7/2006 | Kahn et al. | ............... | 704/278 |

* cited by examiner

*Primary Examiner* — Vivian Chin
*Assistant Examiner* — Con P Tran
(74) *Attorney, Agent, or Firm* — Winston Hsu; Scott Margo

(57) ABSTRACT

The present invention provides a method for checking and modifying the compatibility of an audio analyzing apparatus with an application program. The method includes the steps of: providing a server installed with the program, and a test computer; generating audio signals, and sending the audio signals to the test computer; storing the signals as an audio file; transforming the audio file into a particular format identifiable by the audio analyzing apparatus; invoking the program and analyzing the audio file by the audio analyzing apparatus; determining whether any abnormity is caused by the incompatibility of the audio analyzing apparatus with the program if an abnormity arises during the analyzing process; and modifying the program to be compatible with the audio analyzing apparatus if the abnormity is caused by the incompatibility of the audio analyzing apparatus with the program.

8 Claims, 3 Drawing Sheets

METHOD FOR MODIFYING THE COMPATIBILITY OF AN AUDIO ANALYZING APPARATUS WITH AN APPLICATION PROGRAM

FIELD OF THE INVENTION

The present invention is generally related to methods for checking audio analyzing devices, and more particularly, to a method for checking and modifying the compatibility of an audio analyzing device with an application program.

DESCRIPTION OF RELATED ART

Audio analyzing apparatuses, such as the AP2722 released by AP technology limited, are broadly used to test audio components of electronic devices, such as personal computers, APPLE IPODs, and digital video displayers. The audio analyzing apparatuses typically requires corresponding application programs to run it. Typically, a test server is used to run an application program to control the audio analyzing apparatuses so as to test the audio components. However, because of on-going improvements in the technology of audio testing and newly issued specifications in the audio testing field, manufacturers need to keep developing new apparatuses that apply to the new technologies and specifications.

On the other hand, application programs corresponding to the apparatuses may also require updates so as to be compatible with any newly released apparatuses. However, manufacturers tend not to update the apparatuses corresponding programs according to the new technologies or any newly issued specifications.

What is needed, therefore, is a method to check and modify the compatibility of an audio analyzing apparatus with an application program.

SUMMARY OF INVENTION

One embodiment provides a method for checking and modifying the compatibility of an audio analyzing apparatus with an application program. The method includes the steps of: providing a server installed with the application program of the audio analyzing apparatus, and a test computer connected with the audio analyzing apparatus; generating audio signals at different frequencies and ranges by the server, and sending the audio signals to the test computer; storing the signals as an audio file by the test computer; transforming the audio file into a particular format identifiable by the audio analyzing apparatus; invoking the application program and analyzing the audio file by the audio analyzing apparatus; determining whether any abnormities are caused by the incompatibility of the audio analyzing apparatus with the application program if any abnormities arises during the analyzing process; and modifying the program to be compatible with the audio analyzing apparatus if the abnormities were caused by the incompatibility of the audio analyzing apparatus and the application program.

Other systems, methods, features, and advantages of the present invention will be or become apparent to one skilled in the art upon examination of the following drawings and detailed description.

DETAILED DESCRIPTION

Figure 1:
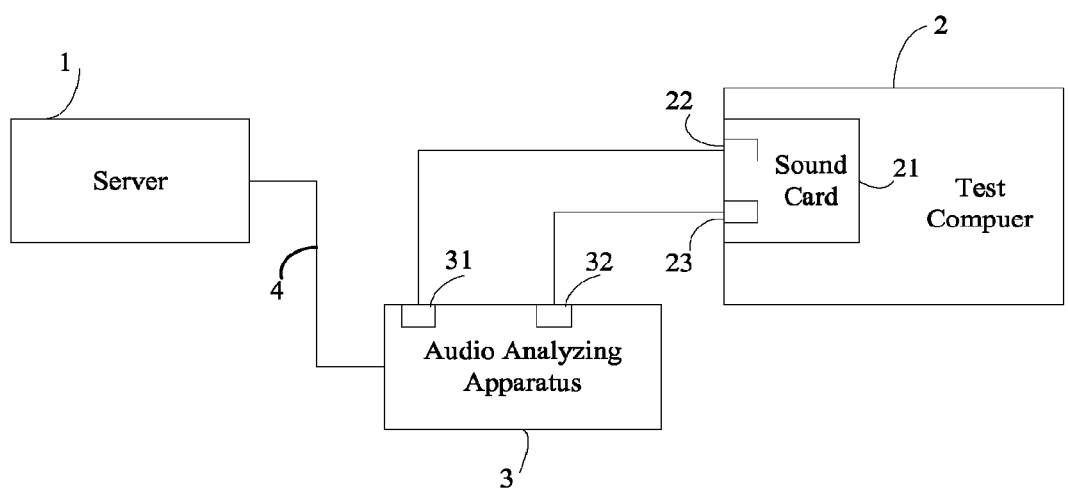
FIG. 1 is a schematic diagram illustrating an application environment for checking and modifying the compatibility of an audio analyzing apparatus with a application program in accordance with one preferred embodiment.

FIG. 1 is a schematic diagram illustrating an application environment for checking and modifying the compatibility of an audio analyzing apparatus with an application program in accordance with one preferred embodiment. The application environment typically includes a server 1, a test computer 2, and an audio analyzing apparatus 3 (hereinafter, "the apparatus 3"). The server 1 is connected with the apparatus 3 via a connection 4. The test computer 2 includes a sound card 21 having an input port 22 and an output port 23. The apparatus 3 includes an analog signal input port 32 connected to the output port 23 of the sound card 21, and an analog signal output port 31 connected to the input port 22 of the sound card 21. The apparatus 3 may further include a digital signal processor (DSP) for processing audio files, such as an AUTHORWARE shocked packet audio formatted file (.aas).

The server 1 is installed with a particular application program of the apparatus 3 that can be used to control the apparatus 3 and test the sound card 21. The server 1 can also be used for checking whether the particular application program is compatible with apparatus 3, and for modifying an incompatible program to be compatible with the apparatus 3.

Figure 2:
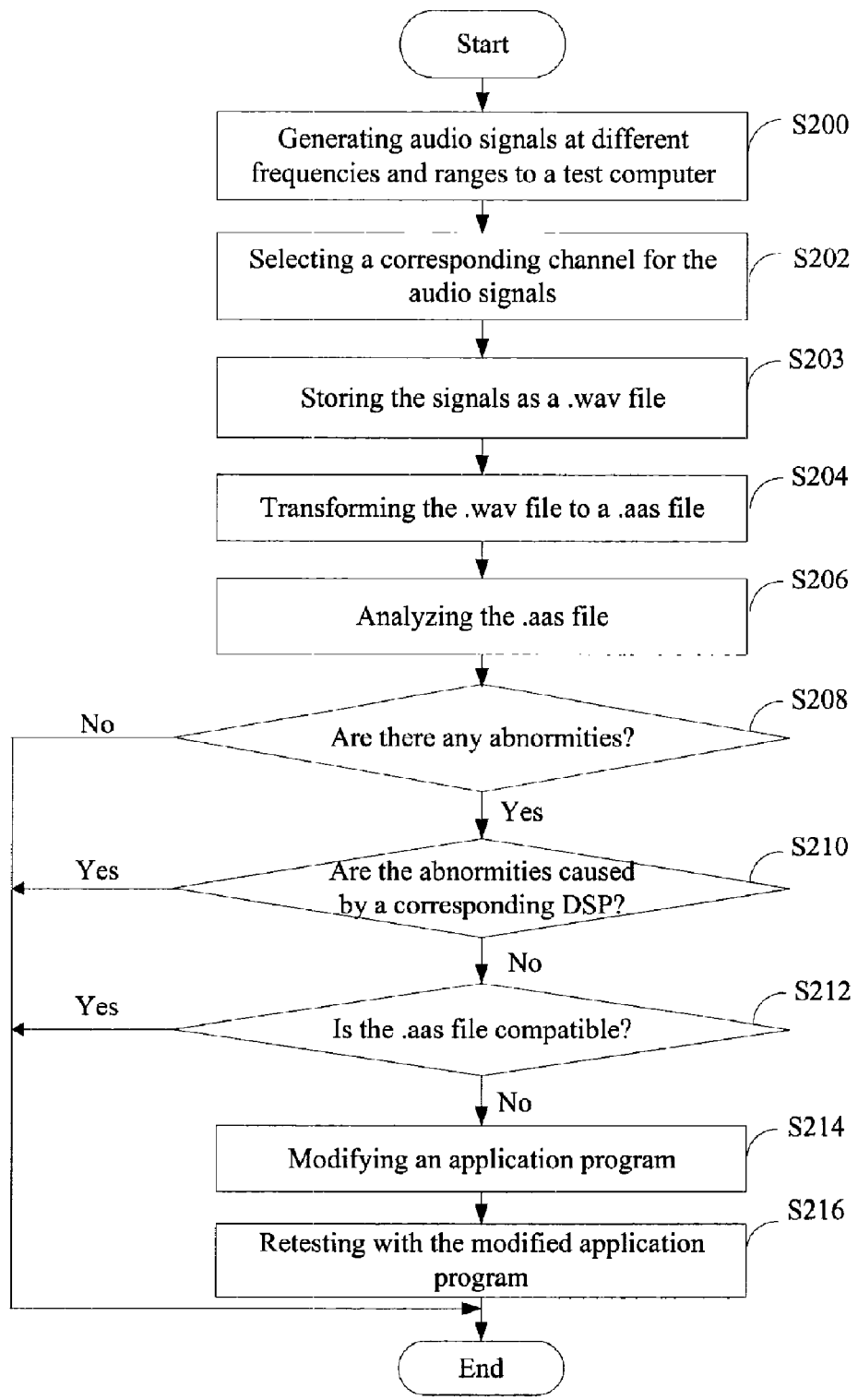
FIG. 2 is a flowchart of a method for checking and modifying the compatibility of an audio analyzing apparatus of FIG. 1 with a application program in accordance with one preferred embodiment.

FIG. 2 is a flowchart of a method for checking and modifying the compatibility of the application program with apparatus 3. In step S200, the server 1 executes the application program installed therein, controls the apparatus 3 to generate audio signals at different frequencies and ranges, and sends the audio signals to the test computer 1. The audio signals are generated according to different tests that, may for example, include a frequency response test, a dynamic range test, and a total harmonic distortion test. The audio signals are outputted from the analog signal output port 31 and transmitted to the input port 22 of the sound card 21.

In step S202, the test computer 2 selects a corresponding channel of the sound card 21 for the audio signals. In step S203, the test computer 2 stores the audio signals received by the sound card 21 in waveform sound file format (.wav). In step S204, the test computer 2 transforms the .wav files to an AUTHORWARE shocked packet file format (.aas) that the apparatus 3 can identify, and transmits the .aas file to the apparatus 3 via the output port 23 of the sound card 21. In step S206, the apparatus 3 receives the .aas file via the analog signal input port 32, divides the .aas file into a plurality of auto template Aldus Persuasion 2.0 formatted (.at2) test files, and analyzes the test files. Each of the test files has a frequency of either 44 k HZ or 48 k HZ.

In step S208, the server 1 determines whether there are any abnormities by analyzing the test files. If there are no abnormities during the analyzing process, in step S210, the server 1 determines whether the abnormities are caused by the DSP of the apparatus 3. Also, .aas files generated in previous successful test processes may be sent directly to the apparatus 3 for analyzing. If there are no abnormities by analyzing other .aas files, it can be determined that there is nothing wrong with the DSP of apparatus 3 and any abnormities detected in step S208 are not caused by the DSP of the apparatus 3. Otherwise, if there are any abnormities analyzing other .aas files, it can be determined that there is something wrong with the DSP of apparatus 3 and any abnormities detected in step S208 are substantially caused by the DSP of the apparatus 3. If the abnormities are not caused by the DSP of the apparatus 3, in step S212, the server 1 determines whether the .aas files are compatible with the DSP of the apparatus 3.

If the .aas file is not compatible with the DSP, it means the abnormities were caused by the incompatibility of the .aas files with the DSP. In step S214, the server 1 modifies the application program being executed therein to be compatible with the DSP of the apparatus 3. The modifying process is illustrated in detail below in relation to FIG. 3. In step S216, the server 1 may use the modified application program to re-test the sound card 21.

On the other hand, if in step S208 there are no abnormities during the analyzing process, the procedure ends. Similarly, if in step S210 it is determined that the abnormities are not caused by the DSP, the procedure ends. If in step S212 it is determined that the .aas files are compatible with the DSP, the test is successful and the procedure ends.

Figure 3:
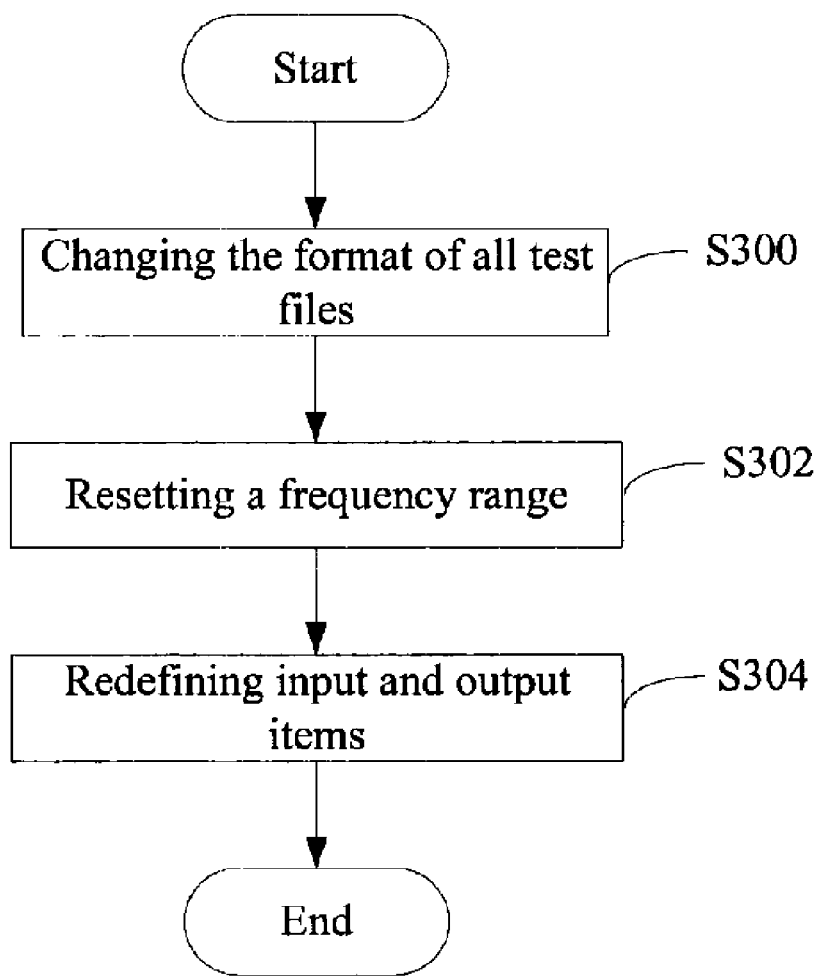
FIG. 3 is a flowchart illustrating one step of FIG. 2 in detail, namely modifying an application program.

FIG. 3 is a flowchart illustrating the details of step S214. In step S300, the server 1 modifies the program to change the format of each of the test files. The format of each test file is changed from .at2 to .at27. The .at27 file is a new test file format identifiable by apparatus 3, such as the AP2700 series released by AP technology limited. In step S302, the server 1 modifies the program to reset a receivable frequency range of audio signals at an upper limitation of 20 k HZ. In step S304, the server 1 redefines input and output items of the application program. In particular, redefining input and output items may include: changing the connection between the test computer 2 with the apparatus 3 to a coaxial cable; changing the reference value of the output sample rate from 192K HZ to 44.1K HZ; and changing the real value of the output sample rate from 96K HZ to 44.1K HZ.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for checking and modifying the compatibility of an audio analyzing apparatus and an application program, the method comprising the steps of:

providing a server installed with the application program of the audio analyzing apparatus, and a test computer connected with the audio analyzing apparatus;

generating audio signals at different frequencies and ranges by the server, and sending at least one audio signal to the test computer;

storing the audio signal as an audio file by the test computer;

transforming the audio file into a particular format identifiable by the audio analyzing apparatus;

invoking the application program and analyzing the audio file of the particular format by the audio analyzing apparatus;

determining whether any abnormities are caused by the incompatibility of the audio analyzing apparatus with the application program if at least one abnormity is detected during the analyzing process; and modifying the application program to be compatible with the audio analyzing apparatus if an abnormity is caused by the incompatibility of the audio analyzing apparatus with the application program.

2. The method according to claim 1, further comprising a step of determining whether any abnormities are caused by a corresponding digital signal processor of the audio analyzing apparatus.

3. The method according to claim 1, further comprising a step of changing the audio file of the particular format into a plurality of test files before analyzing.

4. The method according to claim 3, wherein each of the plurality of test files has a frequency of 44 kHz.

5. The method according to claim 3, wherein each of the plurality of test files has a frequency of 48 kHz.

6. The method according to claim 3, wherein the modifying step comprises the steps of:

changing a format of each of the test files with a particular format that can be compatible with the audio analyzing apparatus;

resetting a receivable frequency range of audio signals with an upper limitation of 20 kHz; and redefining input and output items of the program.

7. The method according to claim 6, wherein each of the test files is changed from an AUTHORWARE shocked packet format to an Aldus Persuasion 2.0 format.

8. The method according to claim 6, wherein the redefining step comprises the steps of:

changing the connection between the test computer with the audio analyzing apparatus to a coaxial cable;

changing the reference value of the output sample rate from 192 kHz to 44.1 kHz; and changing the real value of the output sample rate from 96 kHz to 44.1 kHz.

* * * * *